Figure 1:
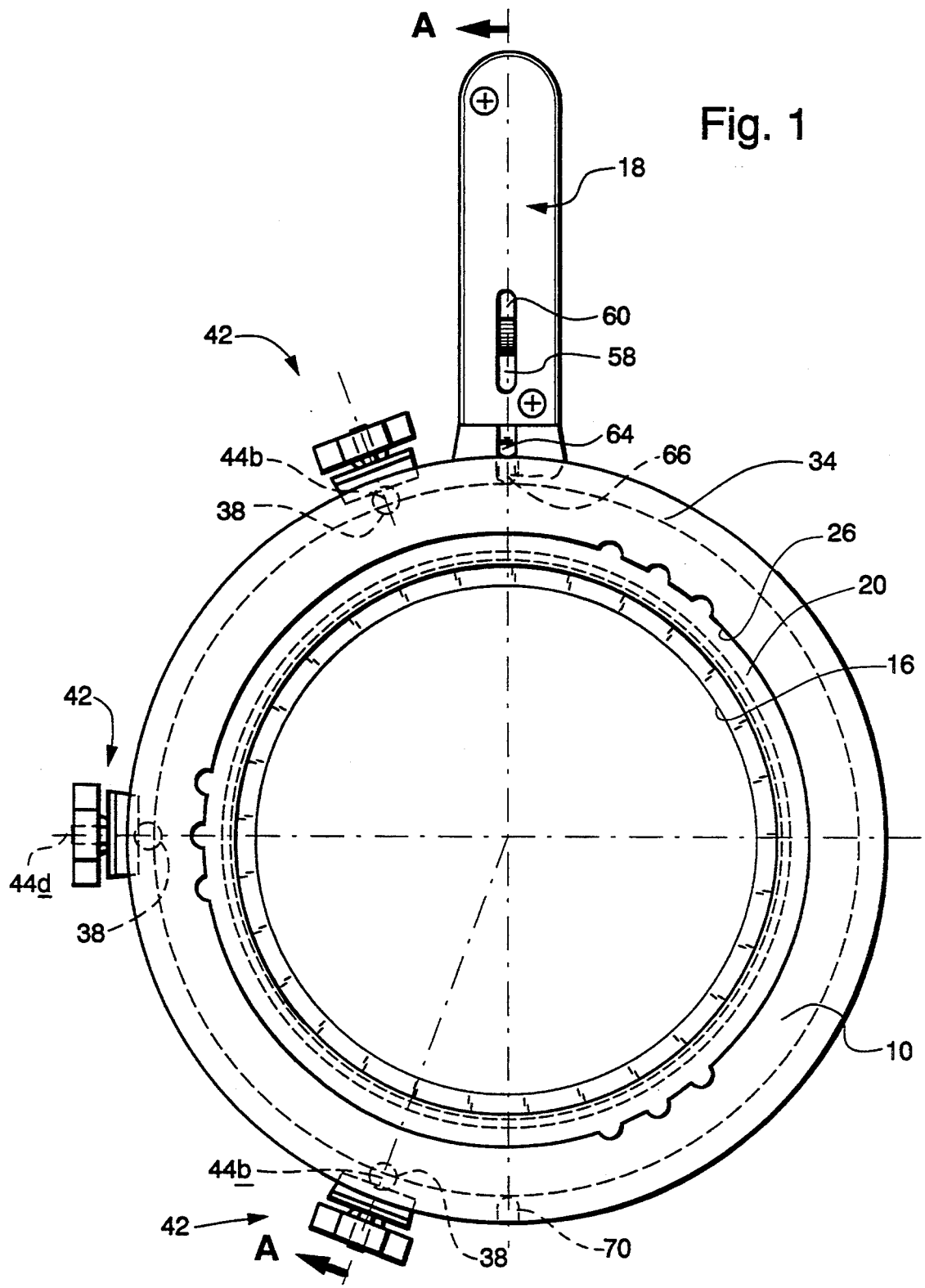

United States Patent [19]
Gillett et al.

[11] Patent Number: 5,449,141
[45] Date of Patent: Sep. 12, 1995

[54] IRIS DIAPHRAGM VALVE

[75] Inventors: David F. Gillett, Congleton; Anthony Goodwin; Keith V. Simpson, both of Macclesfield, all of Great Britain

[73] Assignee: Fuller Company, Bethlehem, Pa.

[21] Appl. No.: 174,640

[22] Filed: Dec. 28, 1993

[30] Foreign Application Priority Data

Jul. 20, 1993 [GB] United Kingdom ................. 9315024

[51] Int. Cl.$^6$ ............................................. F16K 3/03
[52] U.S. Cl. ................................... 251/4; 251/212
[58] Field of Search ................................. 251/212, 4

[56] References Cited

U.S. PATENT DOCUMENTS

| | | | |
|---|---|---|---|
| 2,649,272 | 8/1953 | Barbato | 251/212 |
| 2,835,272 | 5/1958 | Taupin | 251/4 |
| 2,846,179 | 8/1958 | Monckton | 251/4 |
| 2,961,213 | 11/1960 | Philippovic | 251/4 |
| 3,123,262 | 3/1964 | Douglass | 251/4 X |
| 3,329,390 | 7/1967 | Hulsey | 251/4 |
| 3,383,131 | 5/1968 | Rosfelder | 251/4 X |

FOREIGN PATENT DOCUMENTS 2095793  10/1982  United Kingdom ................. 251/212

Primary Examiner—Martin P. Schwadron
Assistant Examiner—Kevin L. Lee
Attorney, Agent, or Firm—Daniel DeJoseph

[57] ABSTRACT

The invention relates to a valve of the iris diaphragm type.

The valve comprises first and second annular body members having respective first and second recesses therein and an annular recess between such first and second body members. A flexible valve closure sleeve is provided with first and second annular mounting flanges at opposite ends and an intermediate flange. The first and second mounting flanges are engaged respectively in the first and second recesses, and the intermediate flange disposed in the annular recess defined between the first and second body members so as to be angularly moveable relative thereto and relative to the first and second annular mounting flanges. Operating means are connected with the intermediate flange for moving the flange between closed and open positions corresponding to closed and open positions of the valve closure sleeve. The valve further comprises securing means for securing the first and second annular body members relative to one another, wherein the first and second body members have respective external fixing regions which are mutually spaced apart, and wherein the securing means comprises a plurality of releasable clamping devices which are spaced apart circumferentially of the body member, wherein each clamping device includes a spacer element engaged between respective fixing regions and a clamping element which embraces the fixed regions so as to hold the latter against the spacer element.

18 Claims, 3 Drawing Sheets

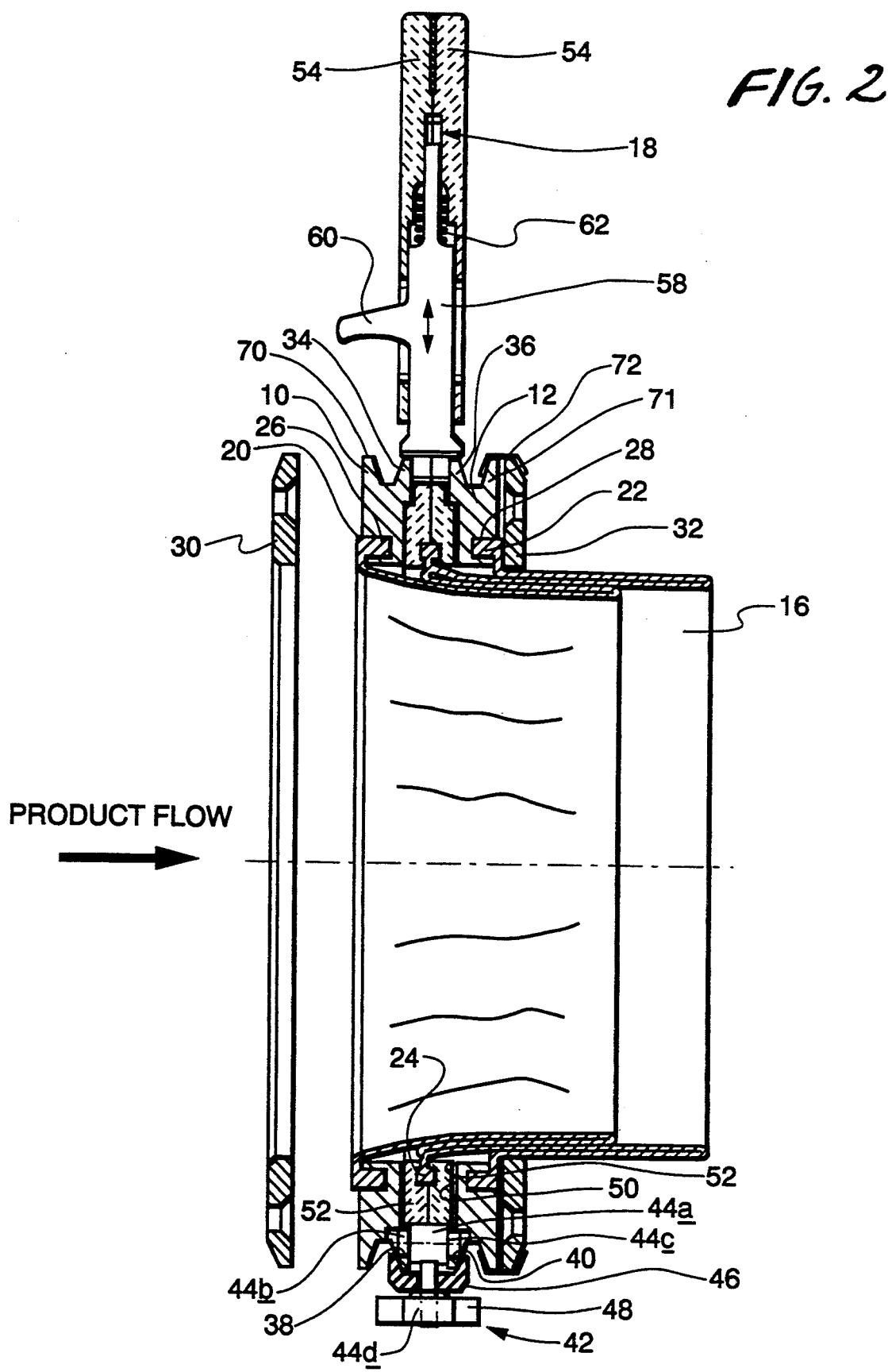

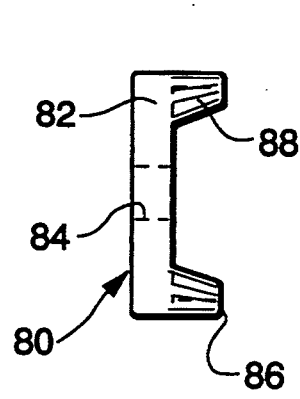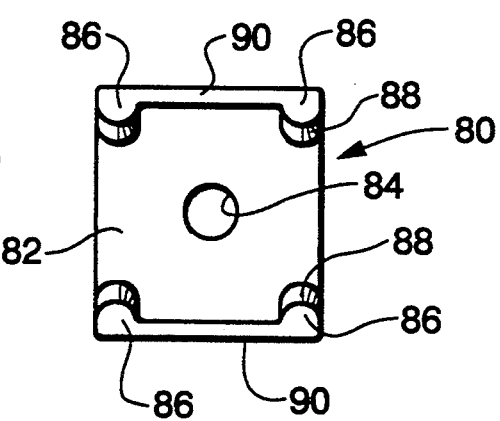

IRIS DIAPHRAGM VALVE

This invention relates to a valve and is more particularly concerned with a valve of the so-called iris diaphragm type wherein a valve closure member takes the form of a flexible sleeve having first and second annular mounting flanges at opposite ends thereof and an intermediate flange.

In such an iris diaphragm valve, angular movement of the intermediate flange relative to the first and second mounting flanges results in twisting of an intermediate portion of the valve closure sleeve relative to the ends so that, in one condition, the sleeve and therefore the valve is closed and in another condition, the sleeve is fully open. Such a valve is most conveniently used for controlling the flow of dry solid particulate material, for example from a storage hopper into a pipe or conduit or into a bag. Such a valve may be operated manually or by means of a motor or a pneumatic or hydraulic piston and cylinder device.

It is an object of the present invention to provide a valve of the above type in a particularly convenient form.

In accordance with one aspect of the present invention, there is provided a valve comprising:
  a. first and second annular body members having respective first and second recesses therein and an annular recess defined between the first and second body members,
  b. a flexible valve closure sleeve having first and second annular mounting flanges at opposite ends thereof and an intermediate flange, the first and second mounting flanges being engaged respectively in the first and second recesses, and the intermediate flange being disposed in the annular recess defined between the first and second body members so as to be angularly moveable relative thereto and relative to the first and second annular mounting flanges,
  c. operating means connected with the intermediate flange for moving the latter between closed and open positions corresponding to closed and open positions respectively of the valve closure sleeve, and
  d. securing means for securing the first and second annular body members relative to one another, wherein the first and second body members have respective external fixing regions which are mutually spaced apart, and wherein the securing means comprises a plurality of releasable clamping devices which are spaced apart circumferentially of the body member, each clamping device including a spacer element engaged between respective fixing regions and a clamping element which embraces the fixed regions so as to hold the latter against the spacer element.

Each releasable clamping device may comprise mutually interengaging screw-threaded male and female members, the clamping element being mounted on the male member. Alternatively, the releasable clamping devices may be of the over-centre action toggle type. The spacer element is preferably formed by part of a head of a screw-threaded stud which forms the male member and which extends externally of the fixing regions to be engaged by the clamping element and the female member.

Most preferably, the external fixing regions have chamfered surfaces for engagement with respective chamfered surfaces of the clamping element.

In a particularly convenient embodiment, each clamping element has two pairs of lugs, the lugs of each pair having a portion which lies on the surface of a cone and which engages against the chamfered part of the fixing region of a respective one of the first and second body members.

The fixing regions of each of the first and second body members are preferably defined by an annular fixing flange.

According to another aspect of the present invention, there is provided a valve comprising:
  a. first and second annular body members having respective first and second recesses therein and an annular recess defined between the first and second body members,
  b. a flexible valve closure sleeve having first and second annular mounting flanges at opposite ends thereof and an intermediate flange, the first and second mounting flanges being engaged respectively in the first and second recesses, and the intermediate flange being disposed in the annular recess defined between the first and second body members so as to be angularly moveable relative thereto and relative to the first and second annular mounting flanges,
  c. operating means connected with the intermediate flange for moving the latter between closed and open positions corresponding to closed and open positions respectively of the valve closure sleeve, and
  d. securing means for securing the first and second annular body members relative to one another, wherein the mounting flanges and the intermediate flange are integrally formed on the outside of the flexible valve closure sleeve, and wherein the mounting flanges also act as gaskets for sealing against items to which the valve is to be connected in use.

The valve preferably incorporates the features of the valve according to said first and second aspects of the present invention.

Preferably, the first and second recesses in the first and second body members are formed in oppositely directed end surfaces and are of a depth which is less than the corresponding dimension of the first and second annular mounting flanges so that portions of the latter project outwardly from the first and second mounting flanges to act as said gaskets.

In a particularly convenient embodiment, the operating means comprises a handle which is engaged with or is integrally formed with the intermediate flange. Alternatively, the operating means may be powered, eg electrically, hydraulically or pneumatically.

In the case where the handle is engaged with the intermediate flange, it is particularly preferred for the handle to include first and second parts of which each comprises an annular portion and a handle portion extending outwardly from the annulus, there being a recess defined between the annular portions which accommodates the intermediate flange of the valve closure sleeve, and the two annular portions, when fitted together, being accommodated in the annular recess defined between the first and second body members, there being an elongate slot defined between the first and second annular body members to accommodate the required movement of the handle.

In a particularly preferred embodiment, an interengaging lug and recess arrangement is provided between at least one of the mounting flanges and the respective body member to lock such mounting flange against rotation relative to the body member. It is particularly preferred for a plurality of peripherally spaced recesses to be provided for selective engagement by the lug whereby to accommodate for any permanent deformation of the sleeve in the circumferential direction.

Preferably, a detent arrangement is provided for locking the handle in positions corresponding to fully open and fully closed conditions of the valve closure sleeve.

Lockable means, e.g., a padlock, is preferably provided for locking the detent arrangement so as to prevent unauthorised operation of the valve.

An embodiment of the present invention will now be described, by way of example, with reference to the accompanying drawings, in which:

FIG. 1 is a plan view of a valve according to said first and second aspects of the present invention, FIG. 2 is a section in the line A—A of FIG. 1, FIG. 3 is an end view of a modified clamping element, and FIG. 4 is a plan view of the clamping element of FIG. 3.

Referring now to FIGS. 1 and 2 of the drawings, the valve comprises first and second annular body members 10 and 12, a flexible valve closure sleeve 16, and valve operating means including a handle 18.

The flexible valve closure sleeve 16, in this embodiment, is a cylindrical sleeve of circular cross section which has been formed of a food-grade flexible polyurethane material by a spin moulding operation. However, other flexible materials formed by other moulding techniques may be employed. The sleeve 16 is integrally formed on its external peripheral surface with first and second annular mounting flanges 20 and 22 disposed at opposite ends of the sleeve 16, and an intermediate flange 24 which is disposed midway along the length of the sleeve 16 in this embodiment. Each of the mounting flanges 20 and 22 projects rearwardly from the end of the sleeve 16 at which it is formed. The first and second body members 10 and 12 have formed on their oppositely directed outer faces respective first and second annular recesses 26 and 28 which have a depth less than the corresponding dimension of the flange 20, 22.

Thus, a portion of each mounting flange 20, 22 projects outwardly from the outer face of the respective annular body member 10, 12 so as to act as a gasket for sealing against items to which the valve is to be releasably connected in use. In the illustrated embodiment, such items comprise a pair of adaptor mounting rings 30, 32 whose purpose will be described hereinafter in greater detail.

The mutually facing portions of the first and second annular body member 10 and 12 are integrally formed with chamfered mounting flanges 34 and 36. Each mounting flange 34, 36 has a set of three apertures 38, 40, respectively. Each aperture 38 is aligned with a respective one of the apertures 40. As will be apparent from FIG. 1, the apertures 38, 40 of each set are circumferentially spaced apart about the respective body member 10, 12 over less than one half of the entire circumference of the latter.

The valve further comprises a plurality of, in this embodiment three, releasable clamping devices indicated generally by arrow 42 which serve to secure the first and second body members 10 and 12 in the required spaced apart relationship to accommodate movement of the handle 18. Each releasable clamping device 42 comprises a screw-threaded stud 44 having a head formed by a central, cylindrical spacer element 44a of enlarged section and a pair of smaller diameter ends 44b and 44c which are respectively engaged in the apertures 38 and 40. The stud 44 has an externally screw threaded shank 44d which projects outwardly beyond the peripheries of the flanges 34 and 36. Each releasable clamping device further includes a clamping element 46 through which the respective shank 44d extends, and a manually operable clamping knob 48 which is internally screw threaded for engagement with the stud 44d. Each clamping element 46 has internally chamfered side edges which engage with the chamfering on the flanges 34 and 36 so that, upon tightening of the knob 42, the flanges 34 and 36 are clamped tightly against the spacers 44a to hold the first and second body members 10 and 12 apart by the desired amount.

The mutually facing surfaces of the body members 10 and 12 are recessed inwardly of the flanges 34 and 36 so as to define an annular chamber 50 in which the intermediate flange 24 is located.

The handle 18 is of two-part construction, each part comprising an annular portion 52 and an handle portion 54. The annular portions 52 are secured together so as to embrace and firmly grip the intermediate flange 24 of the valve closure sleeve 16. The annular portions 52 are angularly moveable within the chamber 50 by operation of the handle 18 so that the valve closure sleeve 16 can be moved between a completely open position (as illustrated in FIGS. 1 and 2) and a completely closed position which is attained by moving the handle through 180° in a clockwise direction as viewed in FIG. 1. Such movement of the handle 18 is permitted because of the above-described arrangement of the releasable clamping devices 42 which leaves an elongate slot extending for more than 180° around the members 10 and 12.

A detent arrangement including a latch 58 with trigger 60 is provided in the handle 18. The latch 58 is biassed by compression spring 62 so that a finger 64 thereof can be selectively engaged with either of a pair of recesses 66 and 68 provided in the body member 10 and 12 at positions corresponding to the fully open and fully closed conditions of the valve closure sleeve 16.

The outwardly facing surfaces of the first and second body members 10 and 12 have chamfered annular flanges 70 and 71 respectively thereon. Such flanges 68 ad 70 are designed to be secured to the adaptor rings 30 and 32, respectively, by means of a quick release band 72 which is provided, in a manner known per se, with an overcentre action toggle lever (not shown) to enable the valve to be quickly attached to and detached from the rings 30 and 32 to facilitate cleaning, servicing and/or replacement of the valve. The rings 30 and 32 have apertures therethrough to enable them to be attached to appropriate parts of equipment with which the valve is to be used. For example, the ring 30 may be secured to the lower outlet of a storage hopper, whilst the ring 32 may be secured to a length of conduit or to a bag filling chute.

In the above-described arrangement, the releasable clamping devices 42 also permit easy dismantling of the valve for cleaning purposes, which makes the valve eminently suitable for use in the food or pharmaceutical industries where hygienic conditions are of paramount importance. Furthermore, it will be appreciated that, because of the design of the valve closure sleeve 16 and flanges 20, 22 and 24, the only part of the valve which actually comes into contact with the material whose flow is being controlled is the internal surface of the sleeve 16 and that there are no additional separate seals or gaskets which periodically require separate removal and cleaning.

In the above-described embodiment, the clamping elements 46 are arcuately curved in the peripheral direction (see FIG. 1) and can, in fact, be conveniently formed by cutting a ring of the appropriate cross section and diameter radially into a number of sections of the appropriate length. This facilitates production of the clamping elements 46, but it does mean that for a different diameter of valve, different clamping elements 46 have to be produced. In order to overcome this problem, clamping elements 80 of the type illustrated in FIGS. 3 and 4 are designed to be used with valves according to the present invention of quite widely varying diameters. Each clamping element 80 comprises a square plate having a central aperture 84 to accommodate shank 44d of stud 44 (see FIGS. 1 and 2). At each corner of the plate 82 there is provided an upstanding lug 86 having an inwardly directed chamfered surface 88 lying on a conical surface. Strengthening ribs 90 extend between the pairs of lugs 86 on opposite sides of the aperture 84. It will be appreciated that, in use, there is effectively only a line contact between the lugs 86 and the respective chamfered surfaces of the flanges 34 and 36 and that such an arrangement can be used for quite a wide variety of valve diameters.

What is claimed is:

1. A valve comprising:
   a. first and second annular body members having respective first and second recesses therein and an annular recess defined between the first and second body members,
   b. a flexible valve closure sleeve having first and second annular mounting flanges at opposite ends thereof and an intermediate flange, the first and second mounting flanges being engaged respectively in the first and second recesses, and the intermediate flange being disposed in the annular recess defined between the first and second body members so as to be angularly moveable relative thereto and relative to the first and second annular mounting flanges,
   c. operating means connected with the intermediate flange for moving the latter between closed and open positions corresponding to closed and open positions respectively of the valve closure sleeve, and
   d. securing means for securing the first and second annular body members relative to one another, wherein the first and second body members have respective external fixing regions which are mutually spaced apart, and wherein the securing means comprises a plurality of releasable clamping devices which are spaced apart circumferentially of the body member, each clamping device including a spacer element engaged between respective fixing regions and a clamping element which embraces the fixed regions so as to hold the latter against the spacer element.

2. The valve of claim 1 wherein each releasable clamping device comprises mutually interengaging screw-threaded male and female members, the clamping element being mounted on the male member.

3. The valve of claim 2 wherein the spacer element is formed by part of a head of a screw-threaded stud which forms the male member and which extends externally of the fixing regions to be engaged by the clamping element and the female member.

4. The valve of claim 1 wherein the releasable clamping devices are of the over-center action toggle type.

5. The valve of claim 1 wherein the external fixing regions have chamfered surfaces for engagement with respective chamfered surfaces of the clamping element.

6. The valve of claim 1 wherein each clamping element has two pairs of lugs, the lugs of each pair having a portion which lies on the surface of a cone and which engages against the chamfered part of the fixing region of a respective one of the first and second body members.

7. The valve of claim 6 wherein the fixing regions of each of the first and second body members are preferably defined by an annular fixing flange.

8. A valve comprising:
   a. first and second annular body members having respective first and second recesses therein and an annular recess defined between the first and second body members,
   b. a flexible valve closure sleeve having first and second annular mounting flanges at opposite ends thereof and an intermediate flange, the first and second mounting flanges being engaged respectively in the first and second recesses, and the intermediate flange being disposed in the annular recess defined between the first and second body members so as to be angularly moveable relative thereto and relative to the first and second annular mounting flanges,
   c. operating means connected with the intermediate flange for moving the latter between closed and open positions corresponding to closed and open positions respectively of the valve closure sleeve, and
   d. securing means for securing the first and second annular body members relative to one another, wherein the mounting flanges and the intermediate flange are integrally formed on the outside of the flexible valve closure sleeve, and wherein the mounting flanges also act as gaskets for sealing against items to which the valve is to be connected in use.

9. The valve of claim 8 wherein the first and second recesses in the first and second body members are formed in oppositely directed end surfaces and are of a depth which is less than the corresponding dimension of the first and second annular mounting flanges so that portions of the latter project outwardly from the first and second mounting flanges to act as said gaskets.

10. The valve of claim 8 wherein the operating means comprises a handle which is engaged with or is integrally formed with the intermediate flange.

11. The valve of claim 10 wherein the handle includes first and second parts of which each comprises an annular portion and a handle portion extending outwardly from the annulus, there being a recess defined between the annular portions which accommodates the intermediate flange of the valve closure sleeve, and the two annular portions, when fitted together, being accommodated in the annular recess defined between the first and second body members, there being an elongate slot defined between the first and second annular body members to accommodate the required movement of the handle.

12. The valve of claim 10 wherein a detent arrangement is provided for locking the handle in positions corresponding to fully open and fully closed conditions of the valve closure sleeve.

13. The valve of claim 12 wherein lockable means are provided for locking the detent arrangement so as to prevent unauthorised operation of the valve.

14. The valve of claim 8 wherein the operating means is powered electrically.

15. The valve of claim 8 wherein the operating means is powered hydraulically.

16. The valve of claim 8 wherein the operating means is powered hydraulically.

17. The valve of claim 8 wherein an interengaging lug and recess arrangement is provided between at least one of the mounting flanges and the respective body member to lock such mounting flange against rotation relative to the body member.

18. The valve of claim 17 wherein a plurality of peripherally spaced recesses are provided for selective engagement by the lug whereby to accommodate for any permanent deformation of the sleeve in the circumferential direction.

* * * * *